A. Van Duzer,
Harvester Cutter.
No. 19319.
Patented Feb. 9, 1858.
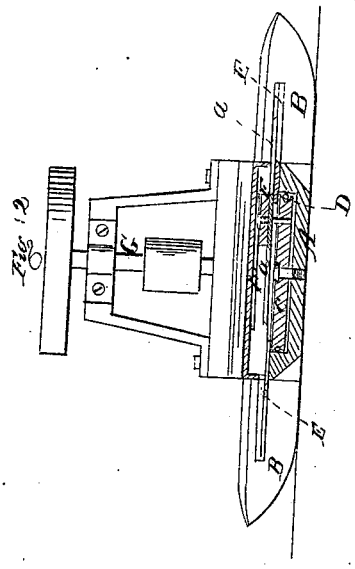
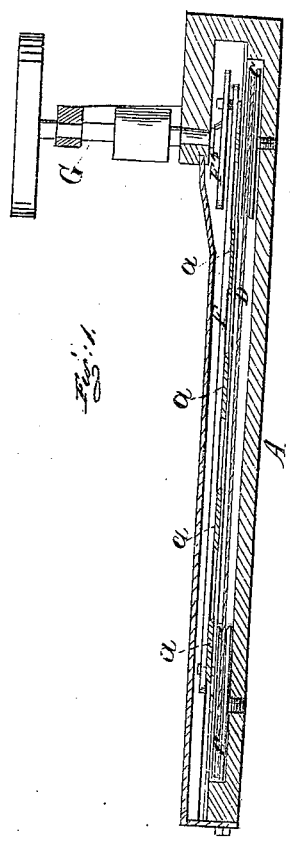
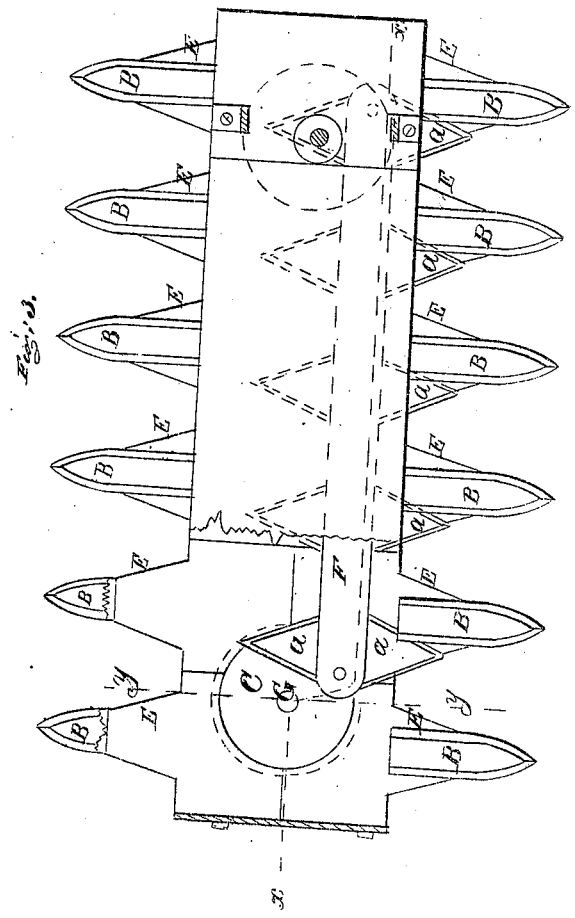

UNITED STATES PATENT OFFICE.

AARON VAN DUZER, OF GOSHEN, NEW YORK.

IMPROVEMENT IN GRAIN AND GRASS HARVESTERS.

Specification forming part of Letters Patent No. 19,319, dated February 9, 1858.

*To all whom it may concern:*

Be it known that I, AARON VAN DUZER, of Goshen, in the county of Orange and State of New York, have invented a new and useful Improvement in Grain and Grass Harvesters; and I do hereby declare that the following is a full, clear, and exact description of the same, reference being had to the annexed drawings, making a part of this specification, in which—

Figure 1 is a longitudinal section of my improvement, taken in the line $x\,x$, Fig. 3. Fig. 2 is a transverse vertical section of my improvement, $y\,y$, Fig. 3, indicating the plane of section. Fig. 3 is a plan or top view of the same.

Similar letters of reference indicate corresponding parts in the several figures.

This invention relates to a new and improved cutting device or sickle; and it consists in having a series of cutters upon both sides of the bar, so arranged that in whichever direction the machine is drawn the grass will be cut, thus rendering the apparatus a right or left hand machine at pleasure.

To enable those skilled in the art to fully understand and construct my invention, I will proceed to describe it.

A represents the finger-bar, to each side of which fingers B are attached. These fingers are slotted, and are of the usual form, as shown clearly in Figs. 2 and 3.

In the upper surface of the finger-bar A two pulleys, C C, are fitted, one near each end, as shown in Figs. 1 and 3. These pulleys are fitted in recesses in the finger-bar, so that the upper surfaces will be flush with the upper surface of the finger-bar. A chain or belt, D, passes around the pulleys C C.

To the upper surface of the finger-bar A and to the fingers B teeth or cutters E are attached. These cutters are of the usual triangular saw-tooth form, and are placed on the bottom of the slots of the fingers. The form of the teeth or cutters is shown clearly in Fig. 3.

To the pulleys C C the ends of a flat bar, F, are attached. The bar is pivoted to the pulleys, and to the innermost pulley C a pulley, F', is attached. The pulley F', which may be termed the "driving-pulley," is directly over the pulley C, and is secured at the lower end by a vertical shaft, G, which has motion given to it in any proper manner from the driving-wheel of the machine.

To the bar F a series of cutters, $a$, are attached. These cutters are of triangular or saw-tooth form, and are attached to each side of the bar F.

From the above description of parts it will be seen that as the pulley F' is rotated a curvilinear reciprocating motion is given the bar F, and the cutters $a$ work over the cutters E, the cutters $a$ describing a curved path in passing over the cutters E. The grass or grain is cut, of course, between the cutters $a$ E.

The object in having fingers B at each side of the finger bar and cutters $a$ at each side the bar F is to allow the cutters to be changed, so that when one set becomes dull the other set may be used by merely attaching the horses to the opposite side of the machine.

Another object in having the cutters upon both sides of the bar is to convert the apparatus into a right or left hand machine at pleasure. The shape of some fields or the arrangement of the fences is such that the grass cannot always be cut close up to the fences by a machine unless its cutters are reversible in their operation, as herein shown.

The endless chain or belt D keeps the pulleys C C rotating in the same direction and prevents the bar F shifting from its proper position, which position is parallel with the sides of the finger-bar. The pulleys, were it not for the chain or belt D, would be liable to change as the bar F passes their centers.

This invention is extremely simple. It may be constructed and applied to a machine as economically as any other. It may be operated or worked with great rapidity without racking or jarring the machine, and the sickle is not liable to become choked or clogged.

Having thus described my invention, what I claim as new, and desire to secure by Letters Patent, is—

The arrangement of cutters and fingers upon both sides of their respective bars, whereby the grass may be cut upon either side of the finger-bar A, as and for the purposes set forth.

AARON VAN DUZER.

Witnesses:
JOHN E. HOWELL,
JOHN J. COOPER.